United States Patent [19]
Costa

[11] Patent Number: 6,151,981
[45] Date of Patent: Nov. 28, 2000

[54] TWO-AXIS CARTESIAN ROBOT

[76] Inventor: Larry J. Costa, 54201 Ash Rd., Osceola, Ind. 46561

[21] Appl. No.: 09/322,597

[22] Filed: May 28, 1999

Related U.S. Application Data

[63] Continuation-in-part of application No. 08/899,681, Jul. 24, 1997, Pat. No. 5,934,141.
[51] Int. Cl.[7] .............................. B25J 9/02; F16H 19/04; F16H 3/44
[52] U.S. Cl. .................................. 74/490.03; 74/490.09; 901/16; 901/23
[58] Field of Search .............................. 74/89.17, 490.03, 74/490.09, 422; 475/286, 295; 901/16, 23, 25

[56] References Cited

U.S. PATENT DOCUMENTS

| | | |
|---|---|---|
| 465,109 | 12/1891 | Dixon . |
| 3,344,933 | 10/1967 | Jelatis et al. ............................. 212/24 |
| 3,972,280 | 8/1976 | Swatik et al. ...................... 475/286 X |
| 4,132,318 | 1/1979 | Wang et al. ......................... 901/16 X |
| 4,243,147 | 1/1981 | Twitchell et al. ...................... 212/159 |
| 4,417,845 | 11/1983 | Burton .................................. 414/733 |
| 4,600,358 | 7/1986 | Graf .................................. 901/16 X |
| 4,770,598 | 9/1988 | Kotani .................................. 414/752 |
| 4,820,109 | 4/1989 | Witt ..................................... 414/282 |
| 4,842,476 | 6/1989 | Shiotani ................................ 414/751 |
| 4,922,173 | 5/1990 | Lawler ................................ 318/568.2 |
| 5,324,163 | 6/1994 | Costa .................................... 414/571 |
| 5,476,358 | 12/1995 | Costa .................................... 414/749 |
| 5,533,858 | 7/1996 | Costa .................................... 414/751 |
| 5,746,565 | 5/1998 | Tepolt ................................ 414/744.5 |
| 5,931,048 | 8/1999 | Slocum et al. ...................... 74/490.07 |
| 5,934,141 | 8/1999 | Costa .................................... 74/89.17 |

FOREIGN PATENT DOCUMENTS 151362 5/1904 Germany .

*Primary Examiner*—David Fenstermacher
*Attorney, Agent, or Firm*—Zarley, McKee, Thomte, Voorhees & Seas; Dennis L. Thomte

[57] ABSTRACT

The robot includes a vertically disposed Y-axis support having an elongated first drive belt and an elongated linear bearing way at one side thereof. A traverse carriage is vertically movably mounted on the Y-axis bearing way and a motor mount is provided on the traverse carriage for movement therewith. The traverse carriage has an X-axis bearing block provided thereon which movably supports an elongated and substantially horizontally disposed X-axis support. The X-axis support has an elongated, flat X-axis drive belt provided thereon positioned between the ends thereof. A drive motor is mounted on the motor mount and has a driven shaft extending horizontally therefrom which is operatively received by a differential drive means. The differential drive means includes an X-axis drive pulley and a Y-axis drive pulley. A Y-axis brake is provided for selective engagement with the Y-axis drive pulley for selectively preventing rotation of the Y-axis drive pulley. An X-axis brake is provided for selective engagement with the X-axis drive pulley for selectively preventing rotation of the X-axis drive pulley. A workpiece manipulating apparatus is operatively secured to the X-axis support. By selectively controlling the Y-axis and X-axis brakes, the workpiece manipulating apparatus may be vertically and horizontally moved into the desired position through the use of a single drive motor and differential drive apparatus.

12 Claims, 6 Drawing Sheets

TWO-AXIS CARTESIAN ROBOT

CROSS-REFERENCE TO RELATED APPLICATION

This is a continuation-in-part application of Petitioner's earlier application Ser. No. 08/899,681 filed Jul. 24, 1997, entitled TWO-AXIS CARTESIAN ROBOT, now U.S. Pat. No. 5,934,141.

BACKGROUND OF THE INVENTION

1. Field of the Invention

This invention relates to a Cartesian robot and more particularly to a two-axis Cartesian robot.

2. Description of the Prior Art

Many types of robotic designs have been previously provided, but they all suffer from one or more shortcomings. To the best of applicant's knowledge, other than the robots described in U.S. Pat. No. 5,476,358; U.S. Pat. No. 5,324,163; and U.S. Pat. No. 5,533,858, the prior Cartesian robot devices require one drive motor for each axis of movement. Although the robotic designs disclosed in applicant's earlier patents did represent a significant advance in the art, it is believed that the invention of the co-pending application achieves significant advances over applicant's earlier devices. Further, it is believed that the instant invention is a significant advance over applicant's earlier devices.

SUMMARY OF THE INVENTION

A two-axis Cartesian robot is described which includes a single drive motor for driving the robot in two directions of movement, namely, the Y and X-axes.

The robot of this invention includes a vertically disposed Y-axis support having an elongated first drive belt and an elongated linear bearing way at one side thereof. A traverse carriage is vertically movably mounted on the Y-axis bearing way and a motor mount is provided on the traverse carriage for movement therewith. The traverse carriage has an X-axis bearing block provided thereon which movably supports an elongated and substantially horizontally disposed X-axis support. The X-axis support has an elongated, flat X-axis drive belt provided thereon positioned between the ends thereof. A drive motor is mounted on the motor mount and has a driven shaft extending horizontally therefrom which is operatively received by a differential drive means such as a planetary gear drive reducer. The planetary gear drive reducer includes an X-axis drive pulley and a Y-axis drive pulley. A Y-axis brake is provided for selective engagement with the Y-axis drive pulley for selectively preventing rotation of the Y-axis drive pulley. An X-axis brake is provided for selective engagement with the X-axis drive pulley for selectively preventing rotation of the X-axis drive pulley. A workpiece manipulating apparatus is operatively secured to the X-axis support. By selectively controlling the Y-axis and X-axis brakes, the workpiece manipulating apparatus may be vertically and horizontally moved into the desired position through the use of a single drive motor and planetary gear apparatus.

It is therefore a principal object of the invention to provide a two-axis Cartesian robot design.

Yet another object of the invention is to provide a two-axis Cartesian robot requiring only a single drive motor.

Still another object of the invention is to provide a two-axis Cartesian robot which achieves movement of a workpiece manipulating apparatus through a planetary gear arrangement, thereby eliminating the need for longer belts, chains, cables, etc.

Still another object of the invention is to provide a two-axis Cartesian robot which is economical in manufacture, durable in use and refined in appearance.

These and other objects will be apparent to those skilled in the art.

DESCRIPTION OF THE PREFERRED EMBODIMENT

Figure 1:
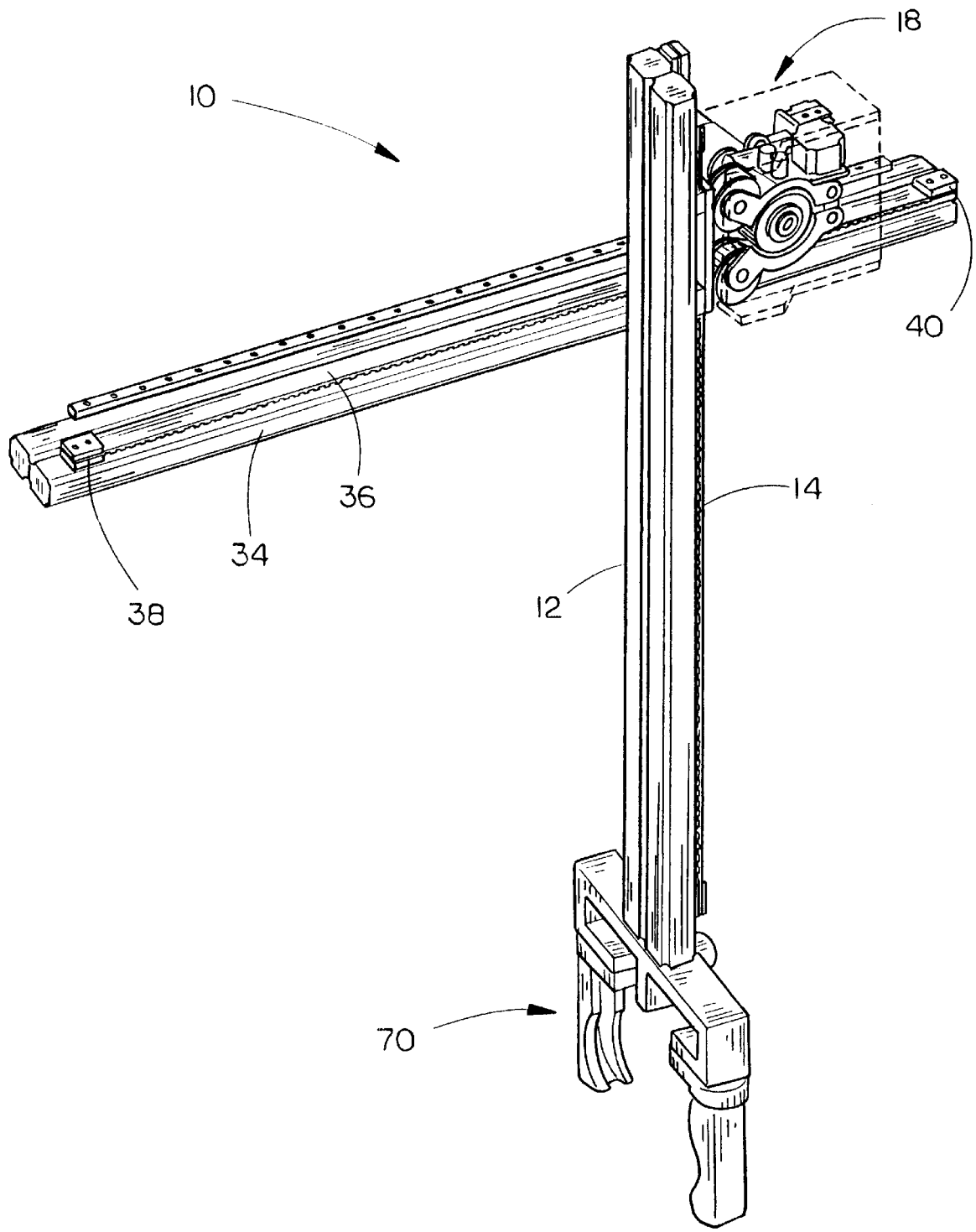
FIG. 1 is a left front perspective view of the two-axis Cartesian robot of the present invention.

The numeral 10 refers generally to the two-axis Cartesian robot of this invention. Robot 10 includes a Y-axis support 12 which is vertically disposed and which has upper and lower ends. A Y-axis drive belt 14 is provided adjacent to the Y-axis support 12 and having first and second anchors 15 and 16 at its upper and lower ends.

The numeral 18 refers to a traverse carriage which is vertically movably mounted on the Y-axis support 12. Carriage 18 is provided with at least one X-axis linear bearing block 20. The numeral 22 refers to an inner mounting plate which is secured to carriage 18 for movement therewith and which is designed to support drive motor 24. Drive motor 24 includes a driven shaft 26 which is operatively connected to a Y-axis drive pulley 28, a differential drive means such as planetary gear reducer 30, and an X-axis drive pulley 32, the details of which will be described in more detail hereinafter. As seen in the drawings, Y-axis drive pulley 28 is in operative engagement with the Y-axis drive belt 14.

The numeral 34 designates an X-axis support. Adjacent and parallel to the X-axis support 34 is X-axis drive belt 36 having first and second ends and anchors 38 and 40 at each end. X-axis drive belt 36 is in operative engagement with the X-axis drive pulley 32. X-axis support 34 is received by the X-axis linear bearing block 20 provided on the carriage 18. The numeral 44 refers generally to a Y-axis brake while the numeral 46 refers generally to an X-axis brake. The brakes 44 and 46 are adapted to selectively prevent the movement of the carriage 18 relative to the Y-axis support 12 and the X-axis support 34. Although other structures are contemplated, the brakes 44 and 46 described herein prevent movement of the carriage 18 by preventing the rotation of the Y-axis drive pulley 28 and the X-axis drive pulley 32, respectively, as will be described in more detail hereinafter.

Y-axis brake 44 and X-axis brake 46 are essentially identical. For the sake of simplicity, only the Y-axis brake will be described in detail.

Y-axis brake 44 includes first and second pulley idler and brake pivot shafts 402 and 404 mounted between the inner mounting plate 22 and the outer mounting plate 406. First and second Y-axis idler pulleys 408 and 410 are rotatably mounted on the first and second pulley idler and brake pivot shafts 402 and 404, respectively. First and second opposing brake pressure pads 412 and 414 are also pivotally mounted on the first and second pulley idler and brake pivot shafts 402 and 404, respectively. Each of the first and second opposing brake pressure pads 412 and 414 is arcuate in shape and, when placed in opposition to each other, substantially circumscribe the Y-axis drive pulley 28.

Figure 2:
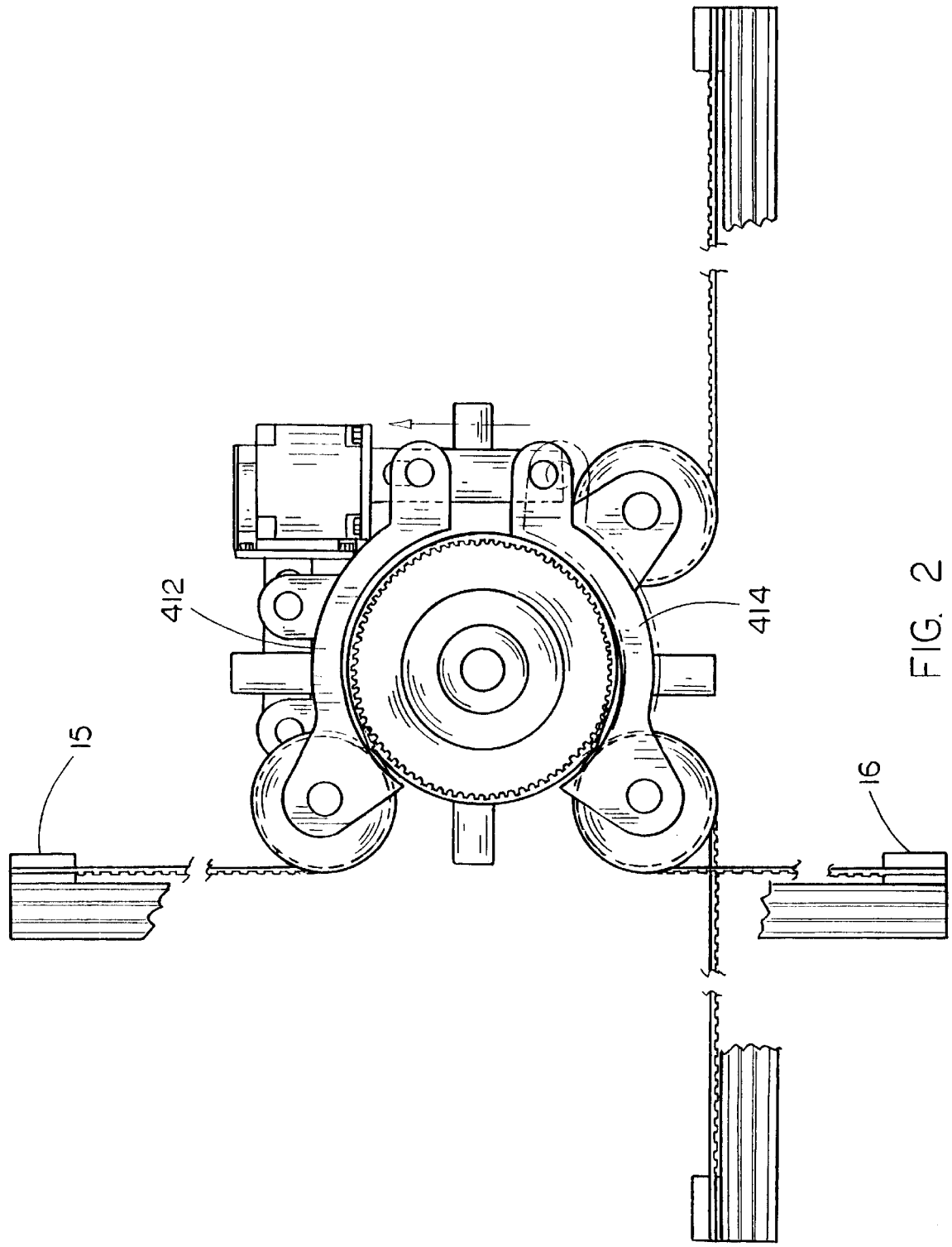
FIG. 2 is a front elevational view of the same.
Figure 3:
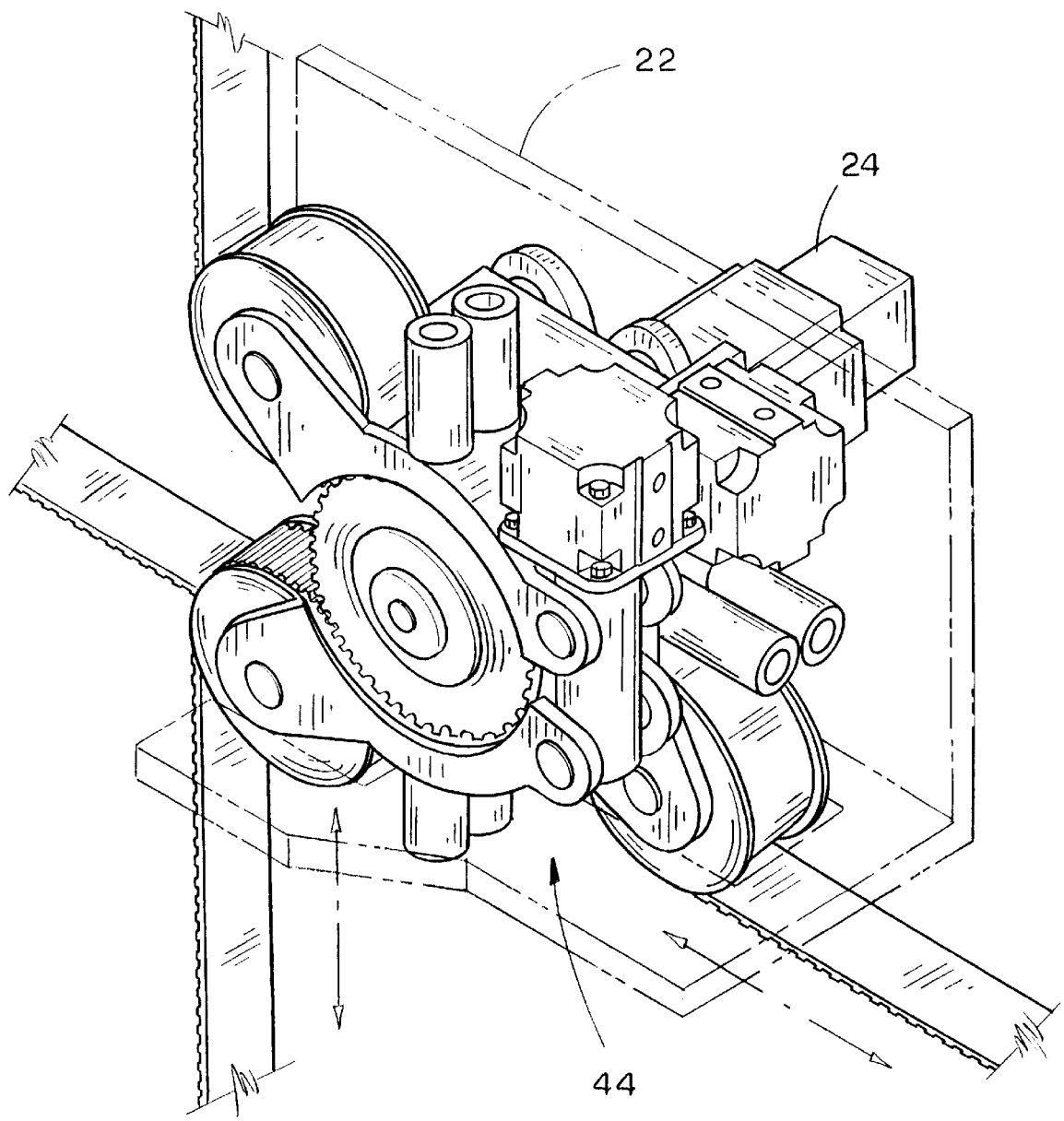
FIG. 3 is a right front perspective view of the same.
Figure 4:
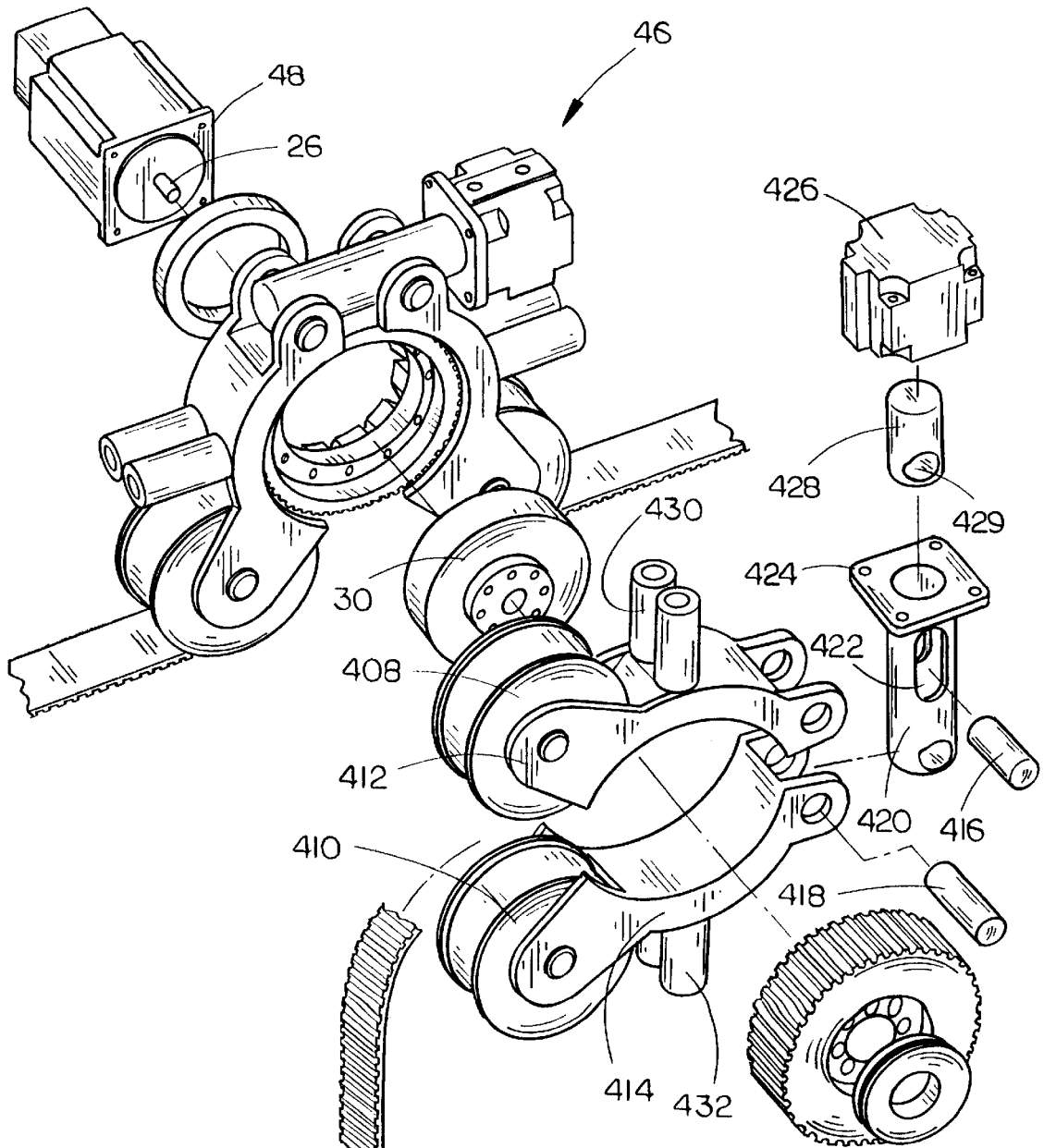
FIG. 4 is a an exploded perspective view of the same.
Figure 5:
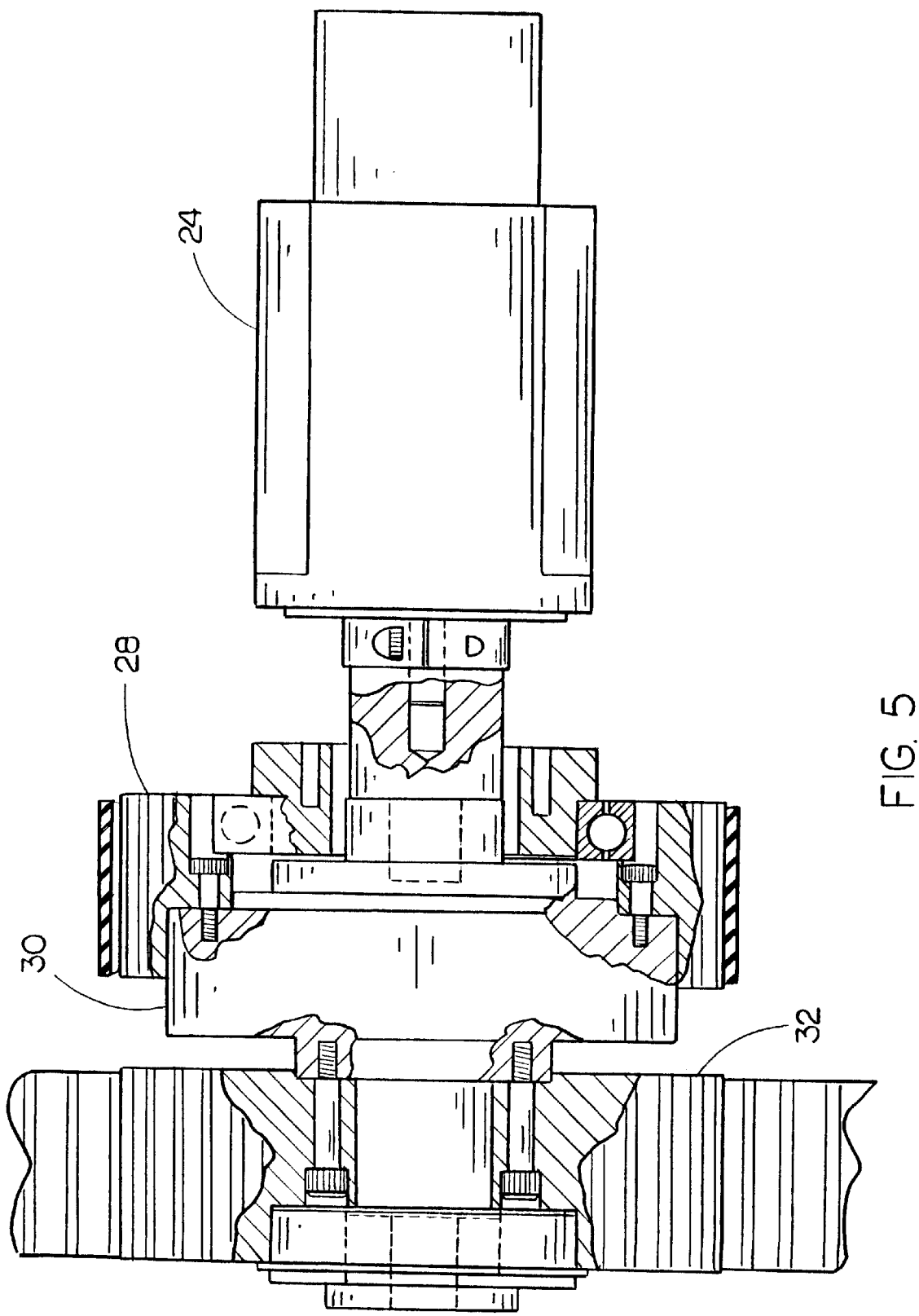
FIG. 5 is a right side view of the same showing, in cutaway fashion, the interrelation of the motor, the drive reducer, and the drive pulleys.
Figure 6:
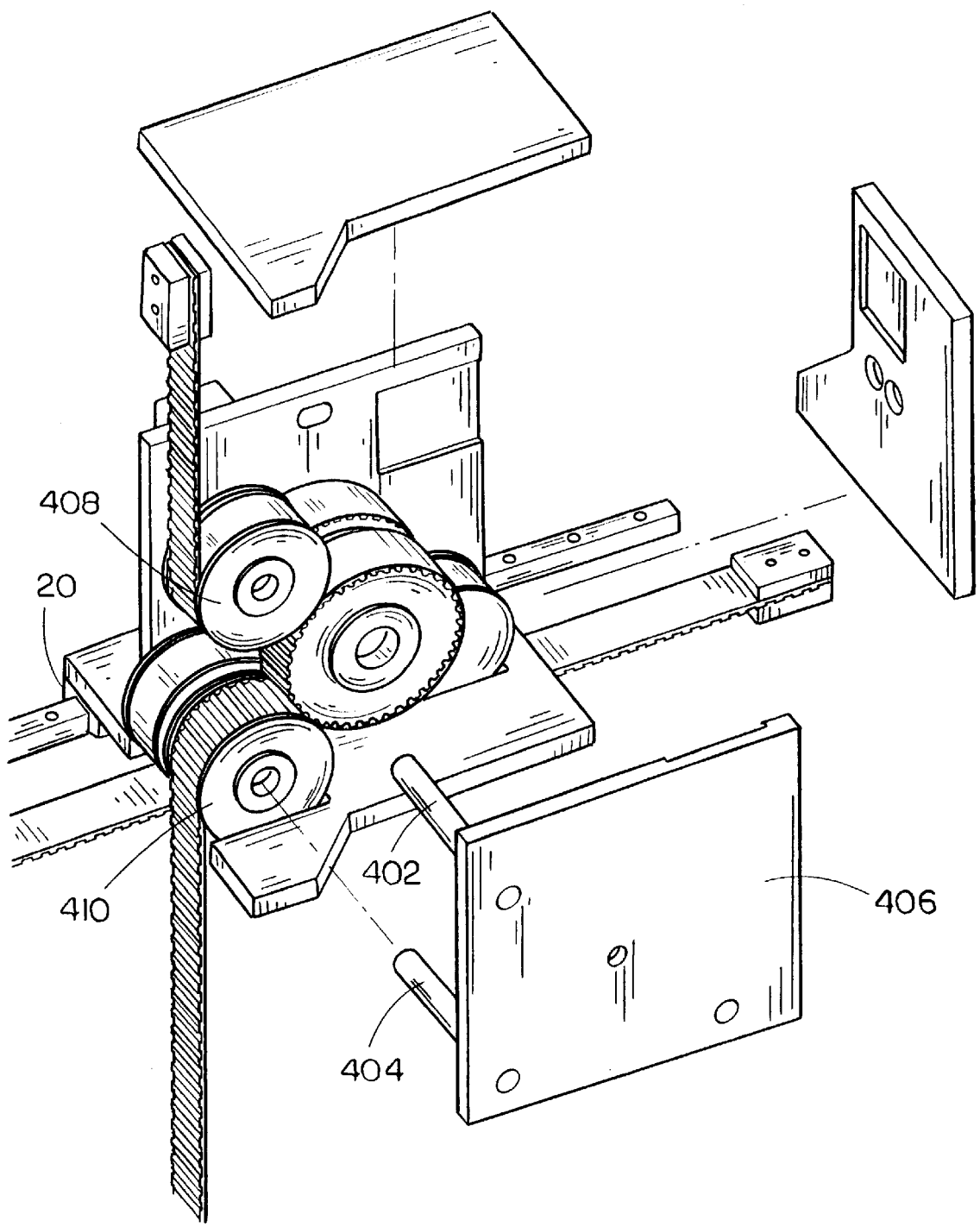
FIG. 6 is an exploded perspective view of the same showing the interrelation of the traverse carriage walls and the pulleys.

Each of the first and second opposing brake pressure pads 412 and 414 has an end distal the first and second pulley idler and brake pivot shafts 402 and 404, respectively. First and second actuator pins 416 and 418 are mounted on the distal ends of the first and second opposing brake pressure pads 412 and 414, respectively. Actuator housing 420 is pivotally mounted on the second actuator pin 418. Actuator housing 420 includes elongated aperture 422 and actuator mount 424. Actuator mount 424 is adapted to support brake actuator 426. Brake actuator 426 is in operable connection with the actuator shaft 428. Actuator shaft 428 is slidably extended into actuator housing 420 and includes an aperture 429 into which first actuator pin 416 is journaled. First actuator pin 416 is also journaled through elongated aperture 422 such that first actuator pin 416 may move lengthwise along the axis of actuator housing 420. Brake actuator 426 is operable to withdraw or extend actuator shaft 428, thereby drawing first and second opposing brake pressure pads 412 and 414 toward or away from each other in closed and opened positions, respectively, as seen in FIG. 2.

In their closed position, the first and second opposing brake pressure pads 412 and 414 are in frictional contact with the Y-axis drive belt 14 and thereby prevent rotation of the Y-axis drive pulley 28. In an opened position, first and second opposing brake pressure pads 412 and 414 are maintained in a central position by first and second opposing brake pressure pad spring sets 430 and 432 so as not to contact Y-axis drive belt 14. The X-axis brake 46 works in essentially the same manner.

Movement of the robot 10 is accomplished through the drive motor 24. Drive motor 24 includes a mounting flange 48 to mount the motor 24 on a carriage 18. The output shaft 26 of the motor 24 extends inwardly into the planetary gear reducer 30.

Planetary gear reducer 30 is in operative engagement with Y-axis drive pulley 28 and X-axis drive pulley 32 as described in the co-pending application no. 08/899,681. Y-axis brake 44 is selectively movable into engagement with the Y-axis drive pulley 28 to selectively prevent the rotation thereof as previously described. X-axis brake 46 is selectively movable into engagement with the X-axis drive pulley 32 to prevent the rotation thereof in similar fashion.

The robot of this invention provides for sequential motion of multiple axes with only a single drive motor 24. The single drive motor 24 is located on the traverse carriage 18 with the Y-axis being the base element and the X-axis being equipped with a work holding manipulator at either of its ends. The work holding manipulator is referred to in schematic form by the reference numeral 70. Each of the X-axis and Y-axis pulleys is held stationary by the conventional brakes previously described. Only one axis brake is released at a time to permit the drive motor to move the released pulley. To hold the robot steady with respect to the X-axis and Y-axis, both the X-axis brake 46 and the Y-axis brake 44 are engaged. The Y-axis brake 44 engages the Y-axis drive pulley 28 to prevent rotation thereof. The X-axis brake 46 engages the X-axis drive pulley 32 to prevent its rotation.

To transmit power to the X-axis, the X-axis brake 46 is released, which permits power to be transmitted by the drive motor 24 through the planetary gear reducer 30 to the X-axis drive pulley 32 that is engaged into the X-axis drive belt 36 so that the X-axis member 34 moves horizontally with respect to carriage 18. The direction of movement of the X-axis member 34 depends upon the rotation of the reversible drive motor 24. In other words, rotation of the motor 24 in one direction will cause the X-axis member 34 to move in one direction and the reverse rotation of the motor 24 will cause the X-axis member 34 to move in an opposite direction.

To alternately transmit power to the Y-axis, only the Y-axis brake 44 is released, which permits power to be transmitted by the drive motor 24 through the planetary gear reducer 30 to the Y-axis drive pulley 28 which is engaged into the Y-axis drive belt 14, thereby causing the carriage 18 to move with respect to the Y-axis member 12, depending upon the rotation of the power shaft 26 by the motor 24.

Thus it can be seen that the robot of this invention permits movement of the work holding manipulator along the X and Y-axes with only a single drive motor and without the need for cables, belts, etc.

Thus it can be seen that the invention accomplishes at least all of its stated objectives.

I claim:

1. A two-axis Cartesian robot, comprising:

a first elongated and substantially vertically disposed Y-axis support having upper and lower ends;

said Y-axis support having an elongated Y-axis bearing way provided thereon positioned between the upper and lower ends thereof;

said Y-axis support having an elongated Y-axis traction means connected to and positioned between the upper and lower ends thereof;

a traverse carriage vertically movably mounted on said Y-axis bearing way;

a motor mount provided on said traverse carriage for movement therewith;

a drive motor mounted on said motor mount and having a driven shaft extending horizontally therefrom;

said traverse carriage having an X-axis bearing block provided thereon;

an elongated and substantially horizontally disposed X-axis support movably mounted on said X-axis bearing block and having first and second ends;

said X-axis support having an elongated X-axis traction means connected to and positioned between said first and second ends thereof;

a differential drive means in operative engagement with said driven shaft and including an X-axis drive means and a Y-axis drive means;

said X-axis drive means being in operative engagement with said X-axis traction means;

said Y-axis drive means being in operative engagement with said Y-axis traction means;

a Y-axis brake for preventing movement of said tranverse carriage relative to said Y-axis support;

an X-axis brake for preventing movement of said traverse carriage relative to said x-axis support;

and a workpiece manipulating apparatus operatively secured to said X-axis support.

2. The two-axis Cartesian robot of claim 1 wherein said X-axis traction means and said Y-axis traction means each comprise a drive belt and wherein said X-axis drive means and said Y-axis drive means each comprise a drive pulley.

3. The two-axis Cartesian robot of claim 2 further comprising:
   opposing X-axis idler pulleys, each having an axle, aligned with said X-axis drive pulley and X-axis drive belt;
   said X-axis brake including opposing X-axis brake pressure pads pivotally mounted on said X-axis idler pulley axles substantially encircling said X-axis drive pulley;
   X-axis actuator means for selectively drawing the opposing X-axis brake pressure pads toward or away from each other;
   opposing Y-axis idler pulleys, each having an axle, aligned with said Y-axis drive pulley and Y-axis drive belt;
   said Y-axis brake including opposing Y-axis brake pressure pads pivotally mounted on said Y-axis idler pulley axles substantially encircling said Y-axis drive pulley;
   Y-axis actuator means for selectively drawing the opposing Y-axis brake pressure pads toward or away from each other; and
   control means for selectively activating said X-axis actuator means and said Y-axis actuator means whereby said opposing X-axis brake pressure pads are drawn toward each other to frictionally prevent the rotation of said X-axis drive pulley and said opposing Y-axis brake pressure pads are drawn toward each other to frictionally prevent the rotation of said Y-axis drive pulley, thereby maintaining said workpiece manipulating apparatus in a stationary position, and whereby said control means selectively activates either said X-axis actuator means to draw said opposing X-axis brake pressure pads away from each other and allow the rotation of said X-axis drive pulley and thereby effect movement of the workpiece manipulating apparatus parallel to said X-axis support or said Y-axis actuator means to draw said opposing Y-axis brake pressure pads away from each other and allow the rotation of said Y-axis drive pulley and thereby effect movement of the workpiece manipulating apparatus parallel to said Y-axis support.

4. The two-axis Cartesian robot of claim 1 wherein said X-axis traction means and said Y-axis traction means each comprise a gear rack and wherein said X-axis engagement means and said Y-axis engagement means each comprise a drive pinion gear.

5. A two-axis Cartesian robot, comprising:
   a first elongated and substantially vertically disposed Y-axis support having upper and lower ends;
   said Y-axis support having an elongated Y-axis traction means thereon positioned between the upper and lower ends thereof;
   a traverse carriage selectively vertically movably mounted on said Y-axis support;
   a drive motor mounted on said carriage;
   an elongated and substantially horizontally disposed X-axis support movably mounted on said carriage and having first and second ends;
   said X-axis support having an elongated X-axis traction means thereon positioned between said first and second ends thereof;
   a differential drive means driven by said drive motor and including an X-axis drive means and a Y-axis drive means;
   said X-axis drive means being in engagement with said X-axis traction means;
   said Y-axis drive means being in engagement with said Y-axis traction means;
   a Y-axis brake for preventing movement of said traverse carriage relative to said Y-axis support;
   an X-axis brake for preventing movement of said traverse carriage relative to said X-axis support;
   and a workpiece manipulating apparatus operatively secured to said X-axis support for movement therewith.

6. The two-axis Cartesian robot of claim 5 wherein said X-axis traction means and said Y-axis traction means each comprise a drive belt and wherein said X-axis drive means and said Y-axis drive means each comprise a drive pulley.

7. The two-axis Cartesian robot of claim 6 further comprising:
   opposing X-axis idler pulleys, each having an axle, aligned with said X-axis drive pulley and X-axis drive belt;
   said X-axis brake including opposing X-axis brake pressure pads pivotally mounted on said X-axis idler pulley axles substantially encircling said X-axis drive pulley;
   X-axis actuator means for selectively drawing the opposing X-axis brake pressure pads toward or away from each other;
   opposing Y-axis idler pulleys, each having an axle, aligned with said Y-axis drive pulley and Y-axis drive belt;
   said Y-axis brake including opposing Y-axis brake pressure pads pivotally mounted on said Y-axis idler pulley axles substantially encircling said Y-axis drive pulley;
   Y-axis actuator means for selectively drawing the opposing Y-axis brake pressure pads toward or away from each other; and
   control means for selectively activating said X-axis actuator means and said Y-axis actuator means whereby said opposing X-axis brake pressure pads are drawn toward each other to frictionally prevent the rotation of said X-axis drive pulley and said opposing Y-axis brake pressure pads are drawn toward each other to frictionally prevent the rotation of said Y-axis drive pulley, thereby maintaining said workpiece manipulating apparatus in a stationary position; whereby said control means selectively activates either said X-axis actuator means to draw said opposing X-axis brake pressure pads away from each other and allow the rotation of said X-axis drive pulley and thereby effect movement of the workpiece manipulating apparatus parallel to said X-axis support or said Y-axis actuator means to draw said opposing Y-axis brake pressure pads away from each other and allow the rotation of said Y-axis drive pulley and thereby effect movement of the workpiece manipulating apparatus parallel to said Y-axis support.

8. The two-axis Cartesian robot of claim 5 wherein said X-axis traction means and said Y-axis traction means each comprise a gear rack and wherein said X-axis engagement means and said Y-axis engagement means each comprise a drive pinion gear.

9. A two-axis Cartesian robot, comprising:
   a first elongated and substantially vertically disposed Y-axis support having upper and lower ends;
   said Y-axis support having a discrete elongated Y-axis traction means thereon positioned between the upper and lower ends thereof;
   a traverse carriage vertically movably mounted on said Y-axis support;

an elongated and substantially horizontally disposed X-axis support movably mounted on said carriage and having first and second ends;

said X-axis support having a discrete elongated X-axis traction means thereon positioned between said first and second ends thereof;

a drive motor mounted on said carriage and having a driven shaft extending horizontally therefrom;

a differential drive means in operative engagement with said driven shaft and including an X-axis drive means and a Y-axis drive means;

said X-axis drive means being in operative engagement with said X-axis traction means;

said Y-axis drive means being in operative engagement with said Y-axis traction means;

a Y-axis brake for preventing movement of said traverse carriage relative to said Y-Axis support;

an X-axis brake for preventing movement of said traverse carriage relative to said X-axis support;

and a workpiece manipulating apparatus operatively secured to said X-axis support for movement therewith.

10. The two-axis Cartesian robot of claim 9 wherein said X-axis traction means and said Y-axis traction means each comprise a drive belt and wherein said X-axis drive means and said Y-axis drive means each comprise a drive pulley.

11. The two-axis Cartesian robot of claim 10 further comprising:

opposing X-axis idler pulleys, each having an axle, aligned with said X-axis drive pulley and X-axis drive belt;

said X-axis brake including opposing X-axis brake pressure pads pivotally mounted on said X-axis idler pulley axles substantially encircling said X-axis drive pulley;

X-axis actuator means for selectively drawing the opposing X-axis brake pressure pads toward or away from each other;

opposing Y-axis idler pulleys, each having an axle, aligned with said Y-axis drive pulley and Y-axis drive belt;

said Y-axis brake including opposing Y-axis brake pressure pads pivotally mounted on said Y-axis idler pulley axles substantially encircling said Y-axis drive pulley;

Y-axis actuator means for selectively drawing the opposing Y-axis brake pressure pads toward or away from each other; and control means for selectively activating said X-axis actuator means and said Y-axis actuator means whereby said opposing X-axis brake pressure pads are drawn toward each other to frictionally prevent the rotation of said X-axis drive pulley and said opposing Y-axis brake pressure pads are drawn toward each other to frictionally prevent the rotation of said Y-axis drive pulley, thereby maintaining said workpiece manipulating apparatus in a stationary position; whereby said control means selectively activates either said X-axis actuator means to draw said opposing X-axis brake pressure pads away from each other and allow the rotation of said X-axis drive pulley and thereby effect movement of the workpiece manipulating apparatus parallel to said X-axis support or said Y-axis actuator means to draw said opposing Y-axis brake pressure pads away from each other and allow the rotation of said Y-axis drive pulley and thereby effect movement of the workpiece manipulating apparatus parallel to said Y-axis support.

12. The two-axis Cartesian robot of claim 9 wherein said X-axis traction means and said Y-axis traction means each comprise a gear rack and wherein said X-axis engagement means and said Y-axis engagement means each comprise a drive pinion gear.

* * * * *